United States Patent [19]
Subrahmanyam

[11] Patent Number: 5,987,250
[45] Date of Patent: Nov. 16, 1999

[54] TRANSPARENT INSTRUMENTATION FOR COMPUTER PROGRAM BEHAVIOR ANALYSIS

[75] Inventor: Pratap Subrahmanyam, Sunnyvale, Calif.

[73] Assignee: Hewlett-Packard Company, Palo Alto, Calif.

[21] Appl. No.: 08/918,729

[22] Filed: Aug. 21, 1997

[51] Int. Cl.$^6$ .................................................. G06F 9/445
[52] U.S. Cl. ............................................................. 395/704
[58] Field of Search .................................. 395/704, 705, 395/701, 184.01, 182.1

[56] References Cited

U.S. PATENT DOCUMENTS

| | | | |
|---|---|---|---|
| 4,503,495 | 3/1985 | Boudreau | 710/241 |
| 5,295,258 | 3/1994 | Jewett et al. | 395/182.1 |
| 5,481,712 | 1/1996 | Silver et al. | 395/701 |
| 5,539,907 | 7/1996 | Srivastava et al. | 395/705 |
| 5,608,866 | 3/1997 | Horikawa | 714/39 |
| 5,748,882 | 5/1998 | Huang | 395/184.01 |
| 5,768,592 | 6/1998 | Chang | 395/704 |

*Primary Examiner*—Tariq R. Hafiz
*Assistant Examiner*—Chameli Chaudhuri Das

[57] ABSTRACT

Analysis of selected aspects of behavior of an application computer program are studied by instrumenting the program in a manner that does not affect the program behavior. A separate analysis file, called a probe instance file, is created apart from the application being instrumented. Innocuous probes are placed at selected locations in the application program to monitor progress and performance of the program. The probes can be implemented by placing markup specifications in a separate part of the file and checking the markup specifications after execution of each instruction in the application program to see whether a probe location is encountered. If so, execution is halted temporarily, and an instance of the corresponding probe code is appended to the probe instance file. Preferably, the probe bodies, i.e. the probe instance file, is subsequently executed as a separate thread. The application therefore runs at full speed. The probe bodies can be simple C statements or any other set of instructions.

11 Claims, 4 Drawing Sheets

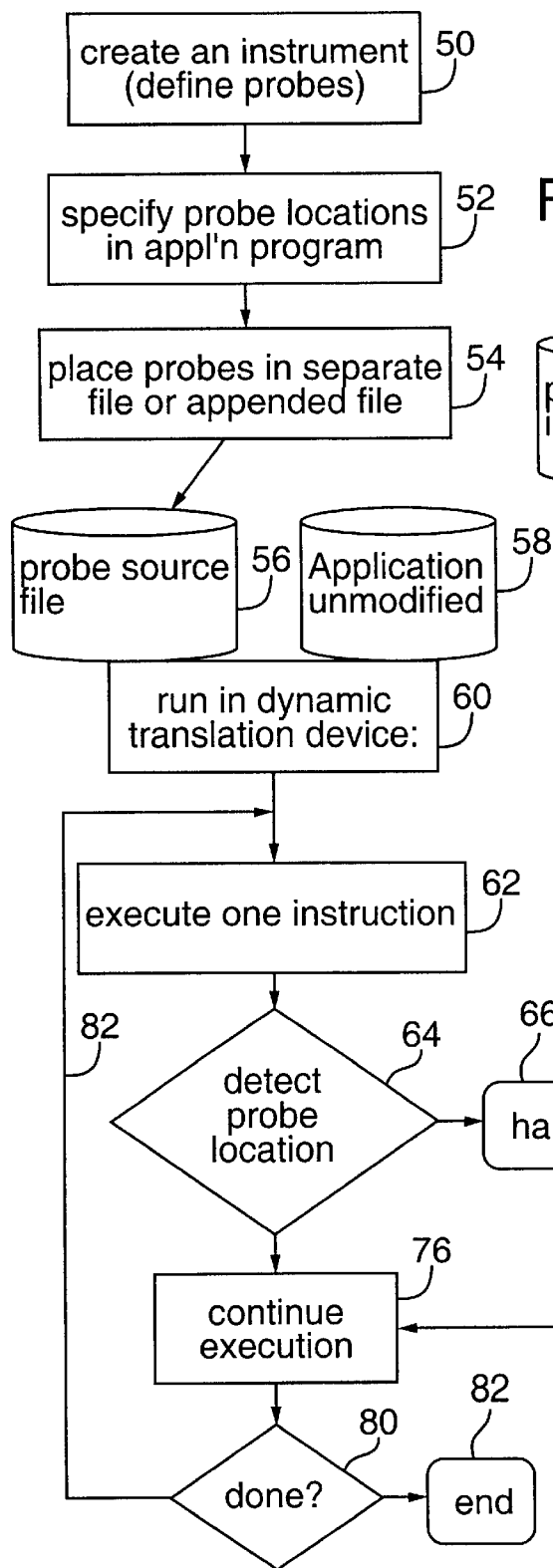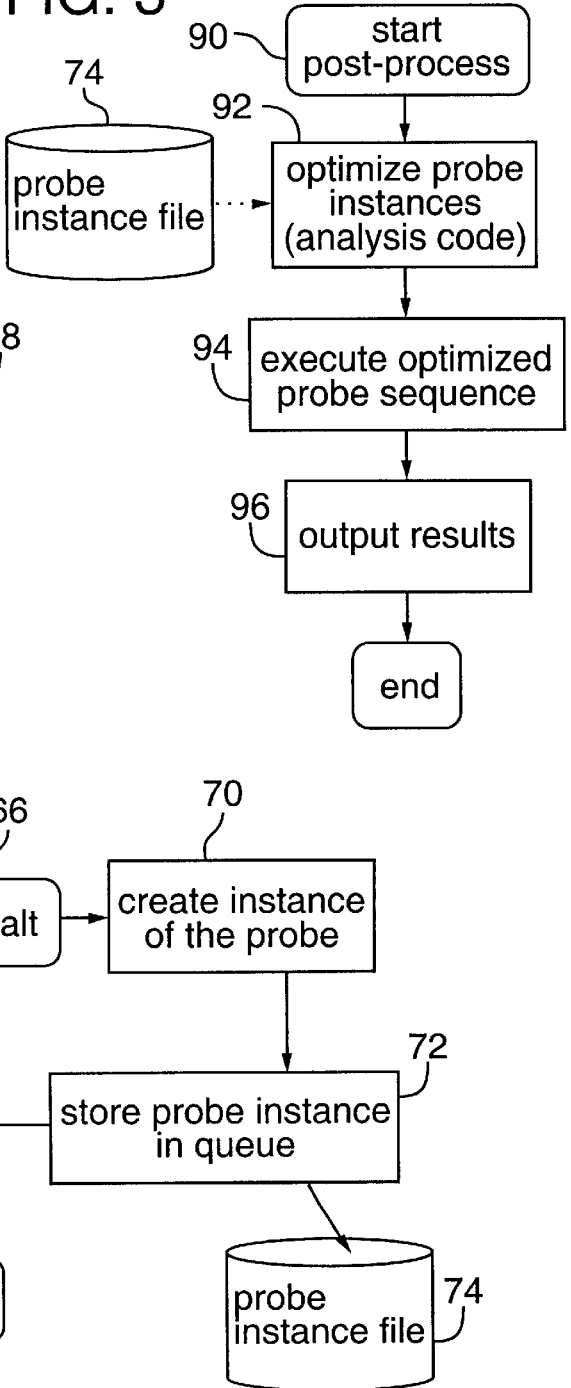
FIG. 2
FIG. 3

Application Program    Marked Program    Probe instance file

TRANSPARENT INSTRUMENTATION FOR COMPUTER PROGRAM BEHAVIOR ANALYSIS

FIELD OF THE INVENTION

This invention pertains to the field of computer program analysis tools and more specifically includes improvements in software instrumentation for understanding and analyzing the behavior of a computer program.

BACKGROUND OF THE INVENTION

Programming tools are important for analyzing the performance of computer programs. A variety of program analysis tools are known. Examples include call graph based profiling tools, instruction profiling tools, system call summary tools, dynamic instruction counters, cache memory modeling, input/output summary tools, load and store counters, etc. These tools help computer architects, for example, evaluate how well programs perform on new hardware platforms. Software authors use such tools to analyze their programs and identify critical pieces of code. Compiler writers often use such tools to find out how well their instruction scheduling or branch prediction algorithms perform.

Designing and building such tools or "instruments" can be challenging. In prior art, the instrumentation code itself necessarily affects operation of the computer and therefore sometimes provides inaccurate results. For example, one system known in the prior art for building customized program analysis tools is described in U.S. Pat. No. 5,539,907 to Srivastava. That system provides a single framework for building a wide range of customized program analysis tools. It provides a common infrastructure present in all code-instrument tools, and thus allows the tool designer to operate at a higher level. Essentially, that system allows a procedure call to be inserted before or after any program, procedure, basic block, or instruction. It separates the tool-specific part from the common infrastructure needed in all tools. It provides the infrastructure for object-code manipulation and a high-level view of the program in object-module form. The user defines the tool-specific part in "instrumentation routines" and specifies the points in the application program to be instrumented, the procedure calls to be made, and the arguments to be passed.

The Srivastava system creates a single, modified executable file such that the application program and the user's analysis routines run together in the same address space. See FIG. 1. Information is directly passed from the application program to the analysis routines, through simple procedure calls instead of inter-process communication. The system takes care that analysis routines do not interfere with the program's execution, but because it operates on the same CPU in the same address space, it necessarily affects the system performance. Moreover, that type of system will pollute the machine's resources, such as the instruction cache. Consequently, any behavior of the instruction cache will not be analyzable precisely. Additionally, since the instrumentation segments must be executed along with the application, it bloats the execution time of the application tremendously. Cases of 10 to 20-fold degradation in performance are not uncommon. Finally, the application must be protected from the instrumentation probes, since the probes will certainly change the register state of the machine. Hence, each probe must be encapsulated into a protective shield code. This shield code is quite "expensive."

In view of the foregoing background, a principal object of the present invention is to provide a non-intrusive means for instrumenting an application program. A goal of the present invention is to allow for studying program behavior without affecting the program behavior. That is, an object of the present invention is to allow instrumenting an application program without making any modification to the application program code, or modifying the code in a way that is transparent during execution.

Another object of the present invention is to provide for flexibility and customizing program instruments, by allowing a user to write custom "probes" as needed. A further object of the present invention is to provide for instrumenting the execution of an application program without affecting the machine's resources so that the program analysis is completely accurate.

A final object of the invention is to speed up execution of the analysis itself.

SUMMARY OF THE INVENTION

The objects of the invention can be achieved by a new system that builds a separate analysis file, called a probe instance file, apart from the application being instrumented. Innocuous probes are placed at selected locations in the application program to monitor progress and performance of the program. This can be implemented, for example, by placing markup specifications in a separate part of the file and checking the markup specifications after execution of each instruction in the application program. The probe in the application program is not itself executable; rather, it causes execution of the application program to halt temporarily, and an instance of the corresponding probe code is appended to the probe instance file. Preferably, the probe bodies, i.e. the probe instance file, is subsequently executed as a separate thread. The application therefore runs at full speed. The probe bodies can be simple C statements.

Thus the present invention includes a method of automatically generating a software probe instance file or queue for improved analysis of the performance of an application computer program. According to the invention, the method calls for, first, defining at least one software probe for acquiring information about a selected aspect of behavior of the application program. Various specific probes are known in the prior art, such as loop counters, cache hit counters, etc. Next is selecting one or more appropriate locations in the application program as "probe locations". These are selected based on the probe itself. For example, a loop counter requires a probe location within the loop of interest.

For each probe location, the method of the invention calls for identifying a selected one of the software probes as associated with the probe location. This association is indicated in a markup specification, rather than inserting the probe code directly into the application executable. Next the application program is executed in an emulation environment while monitoring execution to detect a probe location. During execution, each a time a probe location is detected, execution of the application program is halted, and without changing the state of the execution of the application program, an instance of the software probe associated with the detected probe location is created. That newly created instance of the software probe is appended into the software probe instance file; and then execution of the application program is resumed from the point at which it was halted. In this way, as execution proceeds, the probe instance file is created.

The invention provides improved instrumenting because the probes themselves are not executed when they are encountered. This speeds operation since some probes can get quite bulky. It also avoids polluting the execution environment state or machine resources such as the instruction cache.

Another advantage of the invention is that, since the probes are queued for future execution, it becomes unnecessary to shield the application from the probes. Additionally, the queued probes can later be optimized for efficient execution. This feature saves time.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a flow diagram illustrating a process for instrumenting a program according to the present invention.

FIG. 3 is a flow diagram for post-processing a probe instance file for analyzing a program instrumented according to the invention.

DETAILED DESCRIPTION OF A PRESENTLY PREFERRED EMBODIMENT

Figure 1:
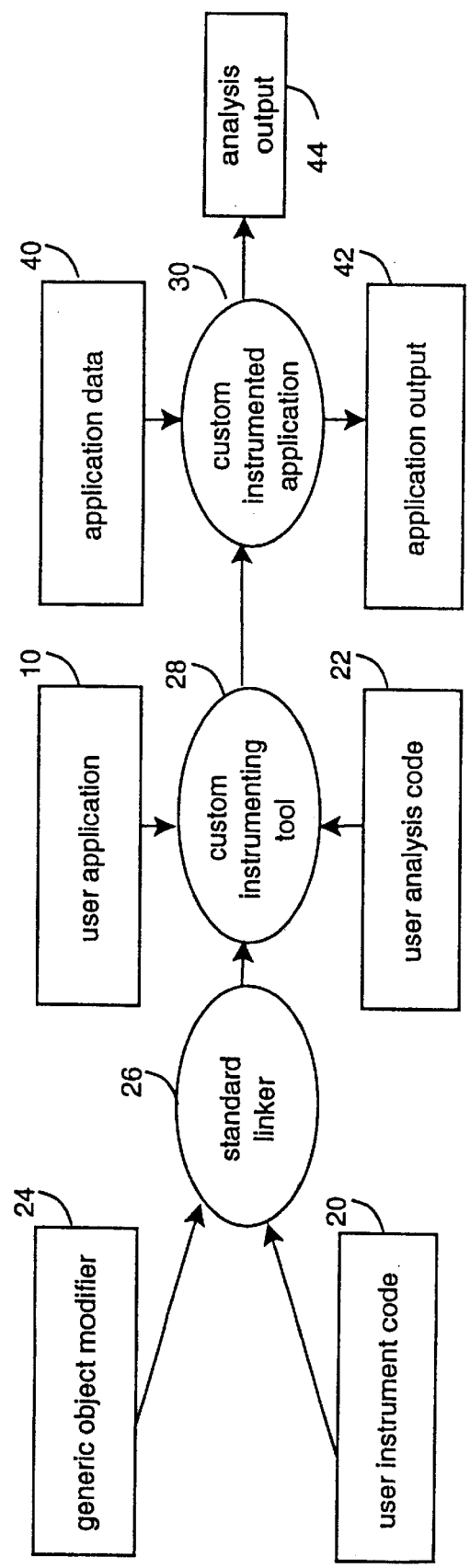
FIG. 1 is a diagram illustrating a prior art process for instrumenting a program.

FIG. 1 is a simplified block diagram illustrating a prior art process for instrumenting a computer program. In this process, the user provides three files: the application program object module 10 that is to be instrumented; a file containing the instrumentation routines 20; and a file containing the analysis routines 22. The instrumentation routines specify where the application program is to be instrumented, an what procedure calls are to be made. The user provides code for these procedures in the analysis routines. A generic object modifier 24 provides certain basic tools that are useful in constructing a custom instrumentation system. These tools are combined with the user's instrumenting code 20 and a standard linker 26 to generate a custom instrumenting tool 28 as mentioned in the background summary above.

The tool 28 receives as inputs the application program 10 and the user analysis routines 22. Finally, the instrumented executable program 30 is created. Here, the data text sections are organized in specific sequences to attempt to provide information about the application to the analysis routines when needed. During execution, application data 40 is input to the custom instrumented executable 30 so as to provide both application output 42 and analysis output 44 essentially concurrently.

As described in the Background, systems of the type described with reference to FIG. 1 do not provide precisely accurate results, since the application program itself as been modified to integrate the instrumentation routines. Attempts to shield the instrumentation code by encapsulation are expensive and still do not avoid the problems of pollution of the machine's resources, such as the instruction cache, during execution.

FIG. 2 is a simplified block diagram of a new process for instrumenting an application program according to the present invention. Referring to FIG. 2, a user creates a desired instrument by defining a set of software probes. Each software probe is a segment of code which may be written for example, in the C language, that in general gathers information about the execution of a program. Various instrumentation routines or probes are known in the prior art. By placing probes at selected locations in a program, the user can instrument the program to accomplish such tasks as block counting, cache simulation, counting load and store instructions, etc. The user also specifies locations in the application program object file which we will call probe locations, step 52 in FIG. 2.

Probe locations are selected locations in the application program at which software probes will be used. However, the software probes themselves are not inserted into the application code at the probe locations. Rather, a flag or marker is provided that simply identifies the location as a probe location. The probes themselves typically are stored in a separate or appended file, step 54, for example in a probe source file 56. Thus, the application file 58 is not modified in any way that will affect its execution. One way to do so is to insert instructions at the probe locations that would be ignored during normal execution of the program on a regular computer. These "mark ups" however, can be recognized in an emulation environment such as a dynamic translation device, suitably programmed. One example of a commercially-available dynamic translation device is Digital's FX!32 product. The mark-up specifications can be provided in a separate section of the application program as illustrated in FIG. 4b. Returning to FIG. 2, the file 58 thus represents the application program "unmodified" in that it will execute normally, but including mark-up specifications recognizable in an emulation environment. Next, the application program is loaded into a dynamic translation device in step 60 for execution.

Execution of the program proceeds as follows. After execution of each instruction, 62, the translation device checks whether the present location in the code is a probe location 64. If a probe location is detected, execution halts, step 66, and the system creates an instance of the associated software probe, step 70, and stores the created probe instance in a queue, step 72. The probe instance queue may be a separate file 74. Next, execution of the application program continues, 76. If execution is not yet completed, test 80, it proceeds via loop 82 to execution of the next instruction. Execution continues in this fashion so that, each time a probe location is detected, the process calls for creating an instance of the software probe associated with the detected probe location, without changing a current state of the execution of the application program. In other words, creation of the sequence of software probes is separate from the execution of the application program, for example being carried out by a separate processor having its own local memory, register stack, etc. After all of the instructions in the marked application program have been executed, execution terminates at step 82.

At this point, the system has created a sequence of probe instances, which may be referred to as a probe instance file, 74. The probe instance file can be executed in a separate thread, concurrently or after completion of execution of the application program.

FIG. 3 illustrates a process for analysis of the application program. Here, a post process begins in step 90. It calls for loading the probe instance file and optimizing that code for more efficient execution, step 92. Various optimization techniques are well-known in prior art for improving the efficiency of execution of the program. It is significant here that the present invention allows for applying optimization tools to the analysis file (the probe instance file), by segregating it from execution of the application program. Next, the optimized probe instance file is executed 94 in order to output results, step 96. Program analysis results can take various forms, depending upon the particular analyses of interest. For example, it may create and present program behavior information in tabular and/or graphical form.

Figure 4A:
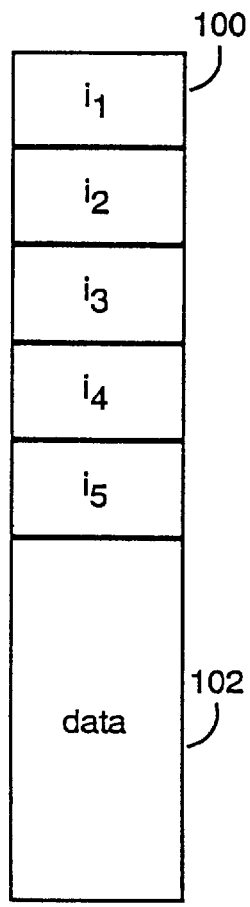
FIG. 4A–4C are simplified code maps further illustrating operation of the present invention.
Figure 4B:
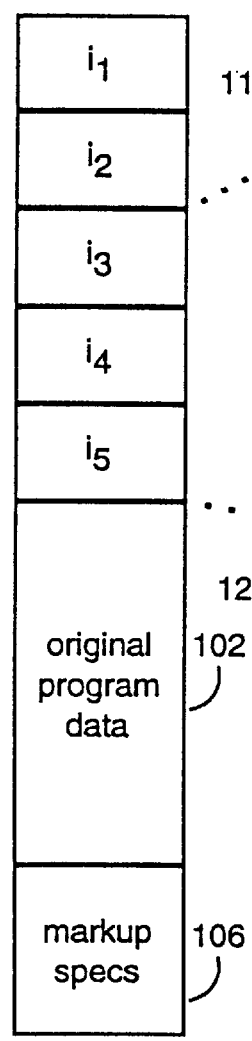
Figure 4C:
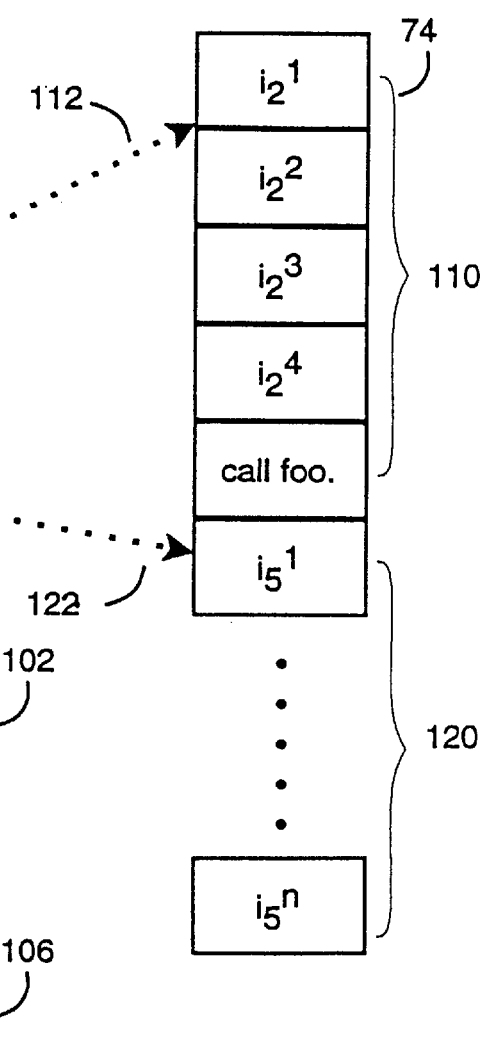

FIGS. 4A–4C further illustrate the present invention. FIG. 4A is a simplified illustration of an application program object file 100, comprising a sequence of instructions $i_1$ through $i_5$, followed by data 102. Referring to FIG. 4B, it may be observed that the series of instructions $i_1$ through $i_5$, have not been modified, Moreover, the original program data 102 is intact. However, the marked program 104 further includes mark-up specifications 106 that identify the probe locations in the program, and the associated software probe code. FIG. 4C illustrates an example of a portion of the probe instance file 74, a first portion of the probe instance file, identified by bracket 110, is a probe instance that was created after execution of the application program in conjunction with $i_1$, as indicated by dotted line 112. A second portion of the probe instance file, identified by bracket 120, was created following execution of the instructions $i_5$ in the marked program, as indicated by dotted line 122. This second software probe consists of instructions $i_5^1$ through $i_5^n$.

Figure 5:
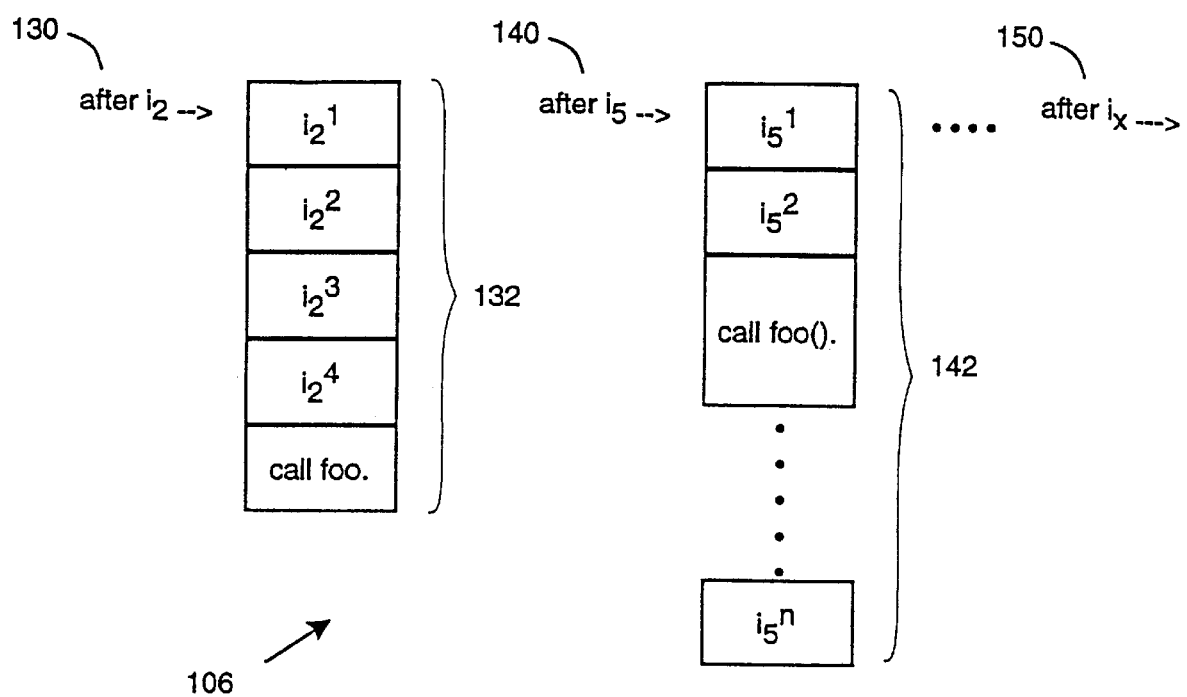
FIG. 5 shows examples of markup specifications for use in instrumenting an application program according to the invention.

FIG. 5 provides an illustration of the contents of the mark-up specifications 106 which are shown as appended to the marked program in FIG. 4B. In FIG. 5, a first probe location 130 is indicated as following after instruction $i_2$. A software probe, i.e., a series of instructions, is associated with the probe location 130. Here, the software probe consists of a series of instructions labeled 132. An instance of this probe, i.e. a copy of these instructions, was inserted into the probe instance file as shown in FIG. 4C, after execution of instructions $i_2$ in the marked program of FIG. 4B. Returning to FIG. 5, a second indication of a probe location 140 is shown "after $i_5$." Associated with that probe location is another software probe 142. Again, FIG. 4C shows how an instance of this software probe was appended to the probe instance file 74 following execution of instruction $i_5$. The mark-up specifications 106 can include additional indications of probe locations as may be necessary for the task at hand. In operation, every time a probe location has been countered in the marked program 104, the process will append an instance of the corresponding software probe into the probe instant file 74. Obviously, if a probe location falls within a loop in the application program, multiple instances of the associated software probe will be appended to the probe instance file. This is how execution of the probe instance file generates information about the dynamic behavior of the application program being instrument.

Having described and illustrated the principles of the invention in a preferred embodiment thereof, it should be apparent that the invention can be modified in arrangement and detail without departing from such principles.

I claim all modifications and variation coming within the spirit and scope of the following claims:

1. A method of automatically generating a software probe instance queue for improved analysis of the performance of a predetermined application computer program, the method comprising the steps of:

defining at least one software probe for acquiring information about a selected aspect of behavior of the application program during execution of the application program;

selecting at least one location in the application program as a probe location;

for each probe location, identifying a selected one of the software probes as associated with the probe location;

executing the application program in an emulation environment while monitoring execution to detect the probe location;

during said execution, each a time a probe location is detected, halting execution of the application program;

without changing a current state of the execution of the application program, creating an instance of the software probe associated with the detected probe location;

without changing a current state of the execution of the program, appending the created instance of the associated software probe into a software probe instance queue; and resuming said execution of the application program from the point at which it was halted, thereby building the software probe instance queue.

2. A method according to claim 1 wherein said defining at least one software probe includes storing the defined software probe in a separate software probe source file, and said step of creating an instance of the software probe includes copying probe code from the software probe source file while execution of the application program is halted.

3. A method according to claim 1 wherein the software probe instance queue is stored as a thread of the application program object file.

4. A method according to claim 1 wherein the step of selecting at least one location in the application program as a probe location includes storing an indication of the selected probe location in a markup section appended to the application program, thereby forming a marked application program.

5. A method according to claim 4 wherein the step of identifying a selected one of the software probes as associated with the probe location further includes writing a copy of the selected software probe into the markup section of the application program in association with the corresponding probe location.

6. A method of instrumenting an application computer program comprising the steps of:

creating one or more software probes;

selecting one or more locations in the application program object file as probe locations;

associating each one of the selected probe locations with a selected one of the software probes;

executing the application program;

during execution of the application program, halting execution at each probe location;

for each probe location, while execution is halted, sequentially storing an instance of the associated software probe in a probe queue, and then resuming execution of the application program; and after termination of the application program, executing the sequence of stored probe instances to analyze performance of the application program.

7. A method according to claim 6 further comprising optimizing the stored sequence of probe instances before executing the probe instances.

8. A method according to claim 7 wherein said optimizing step includes path length reduction optimizations.

9. A method according to claim 6 wherein the step of creating a software probe includes writing the software probe in the form of a sequence of C language instructions.

10. A method according to claim 6 wherein the step of executing the application program includes running the program on a dynamic translation platform.

11. A method according to claim 6 further comprising modifying the stored sequence of probe instances without modifying the application program and then executing the modified sequence of probe instances.

* * * * *